United States Patent [19]

Pfefermann

[11] Patent Number: 5,538,780
[45] Date of Patent: Jul. 23, 1996

[54] CONNECTING ELEMENT USING SILICIC ACID PARTICLES TO PROVIDE DETACHABLE ADHESION

[75] Inventor: Rainer Pfefermann, Rosenheim, Germany

[73] Assignee: Amoena Medizin-Orthopädietechnik GmbH, Raubling, Germany

[21] Appl. No.: 199,049

[22] Filed: Feb. 18, 1994

[30] Foreign Application Priority Data

Feb. 18, 1993 [DE] Germany .................. 9302387 U

[51] Int. Cl.⁶ .................................................. B32B 5/16
[52] U.S. Cl. ........................ 428/149; 428/220; 428/338; 428/141; 428/143; 428/41.4; 428/343; 428/355; 428/331; 428/323; 428/448
[58] Field of Search ................................. 428/220, 338, 428/141, 143, 149, 40, 41, 42, 343, 355, 331, 323, 448

[56] References Cited

U.S. PATENT DOCUMENTS

| | | | |
|---|---|---|---|
| 4,138,527 | 2/1979 | Malek | 428/425 |
| 4,842,988 | 6/1989 | Herrmann et al. | 430/14 |
| 4,941,791 | 7/1990 | Iwamoto | 412/19 |
| 5,017,457 | 5/1991 | Herrmann et al. | 430/272 |

FOREIGN PATENT DOCUMENTS

| | | |
|---|---|---|
| 1569430 | 7/1969 | Germany . |
| 1545468 | 4/1976 | United Kingdom . |

OTHER PUBLICATIONS

Database WPI, Sec. Ch, Week 9305, Derwent Pub. Ltd., London, GB; Class A14, AN 93–039425 & JP–A–04 363 377 (Pyramid KK), 16. Dec. 1992.
Patent Abstracts of Japan, vol. 016 No. 034 (M–1204), 28. Jan. 1992 & JP–A–03 243399 (Dainippon Printing Co. Ltd0 30 Oct. 1991.

Primary Examiner—William P. Watkins, III
Attorney, Agent, or Firm—Morgan & Finnegan

[57] ABSTRACT

The invention relates to a connecting element comprises two strips adapted to be connected with the parts and/or bodies to be joined, and which after being thrust together detachably adhere together. In order to attain the aim of creating such a connecting element with an extremely low height and more particularly by pliancy and softness the first strip comprises a support tape of pliant material, on which a material composed of particles such as silicic acid with a size between fine-grained and pulverulent is adhered. The other strip may comprise a material with elastic and plastic properties.

8 Claims, 1 Drawing Sheet

CONNECTING ELEMENT USING SILICIC ACID PARTICLES TO PROVIDE DETACHABLE ADHESION

The invention relates to a connecting element comprising two strips able to be connected with the parts and/or bodies to be connected and which on being thrust together adhere detachably to one another.

Connecting elements of this type are known in the form of so-called burr fasteners.

One object of the invention is to provide a connecting element of the type initially mentioned which is characterized by an extremely low height and more especially by pliancy.

In accordance with the invention in the case of a connecting element of this type this object is to be attained since the first strip comprises a support tape of pliant material, on which a material composed of particles with a size between fine-grained and pulverulent is adhered and the other strip comprises a material with elastic-plastic properties. In the case of the connecting element in accordance with the invention the first strip consists of a support tape with adhering fine-grained material so that the same generally possesses the character of fine-grain sand or emery paper. The adherent grains may be irregular and should have a maximum surface area. If the first strip is thrust against the other strip of elastic-plastic material the grains will be pressed into the material, the adhesive force only being developed after some seconds because a chemical and physical connection is produced between the elastic-plastic material and the so-called "reactive centers" of the grains.

In accordance with a particularly preferred embodiment the material composed of particles with a size between fine-grained to pulverulent comprises silicic acid AEROSIL (a high dispersed amorphous silicon dioxide, $SiO_2$) or a material based on silicic acid or silica, whereas the other tape preferably comprises a silicone rubber with a low degree of hardness. In accordance with a more particularly preferred embodiment of the invention there is a provision such that the soft silicone rubber additionally includes silicic acid.

The chemical and physical connection or bond is produced because hydrogen bridges are produced between the silicic acid molecules of the fine-grained material applied to the support tape and the other tape of silicone rubber.

It is particularly advantageous to utilize a combination in which hydrophobized, highly dispersed silicic acid is applied to the support tape or the support film and the other tape comprises silicone rubber, to which hydrophobized, highly dispersed silicic acid is added. Because the silicic acid molecules are present in a more or less open state on the surface of the two tapes and the tape of addition-cross linked silicone rubber is soft, the effectiveness of the chemical and physical connection is enhanced.

A particular advantage of the connecting element in accordance with the invention is to be seen in its extremely low overall height. The overall height of the connecting element may be set at a thickness of 0.5 mm.

The support tape can consist of a fabric or a plastic film. Preferably the support tape is a PU film.

The fine-grained to pulverulent material is conveniently adhered on the support tape by means of a plastic adhesive or paint.

The join produced by the connecting element in accordance with the invention may be repeatedly released and remade again. After detachment of the support tape with the fine-grained material owing to roughness a smooth surface is formed again on the other strip after a short recovery time.

One embodiment of the invention will now be described in the following in more detail with reference to the drawing.

Figure 1:
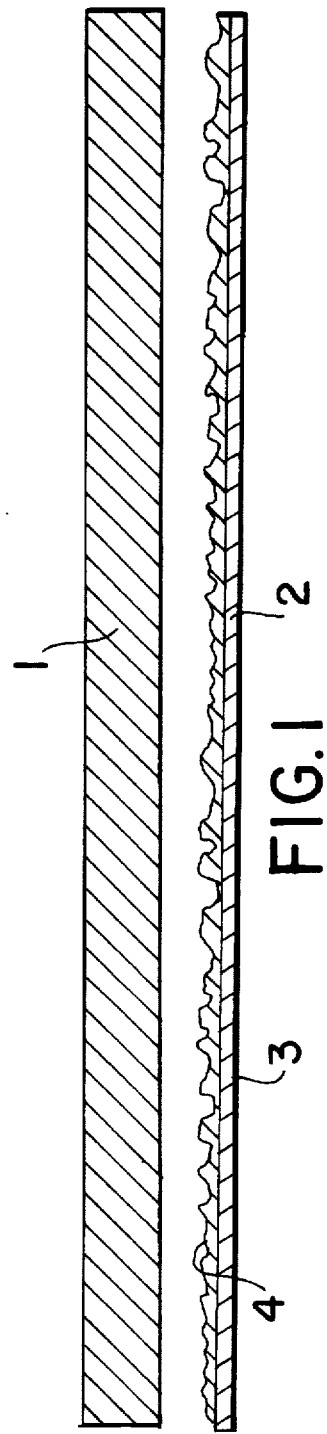
FIG. 1 is a longitudinal section taken through the two strips constituting the connecting element prior to being pressed together.

In FIG. 1 a tape-like strip 1 of silicone rubber is depicted, to which hydrophobized, highly dispersed silicic acid has been added. This tape is able to be connected with the tape-like strip 2 by pressing the same together, such strip 2 consisting of a support tape on which the hydrophobized, highly dispersed silicic acid 4 has been adhered.

Figure 2:
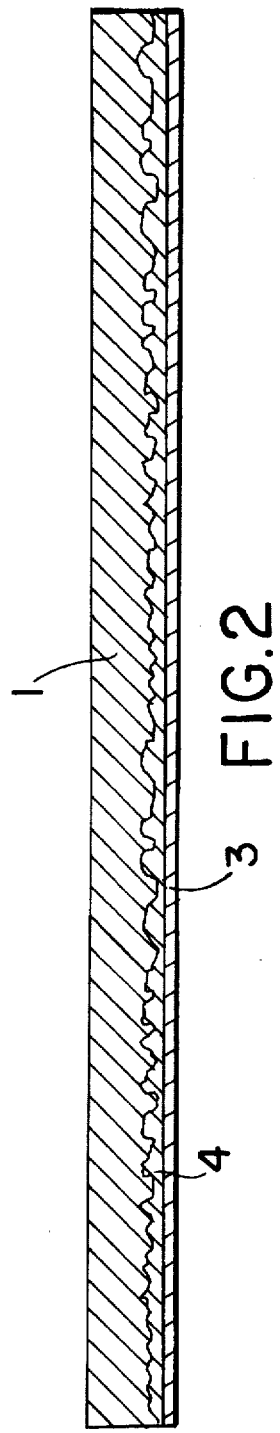
FIG. 2 is a longitudinal section taken through the connecting element, wherein the two strips are connected together.

FIG. 2 indicates the tapes 1 and 2 in their connected or bonded state.

In order to serve as connecting elements the support tape of the support film 2 and the tape-like strip 1 are joined in a known fashion with the parts or surfaces to be connected.

Figure 3:
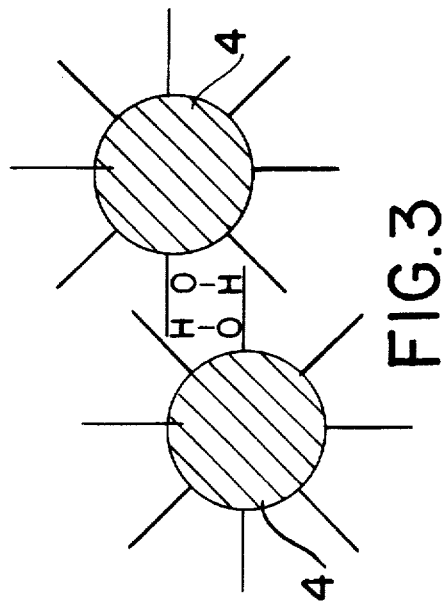
FIG. 3 is a model of the hydrogen bridge formation between the silicic acid particles.

There are silicic acid molecules both in the tape-like strip 1 of silicone rubber, which preferably has been enriched with hydrophobized, highly dispersed silicic acid and also in the layer 3 adhered to the support tape 2, such molecules forming hydrogen bridges with an excellent adhesive effect. This hydrogen bridge formation is illustrated with reference to FIG. 3 using the model of silicic acid molecules.

I claim:

1. A connecting element comprising a first strip and a second strip which are able to be connected to parts or bodies, wherein said first strip and said second strip detachably adhere together after being thrust together and wherein the connection between the first strip and second strip can be repeatedly released and remade again, said first strip comprising a support tape (2) of pliant material having adhered thereto particles with a size between fine-grained and pulverulent, said particles being composed of particles of eilicic acid or a material based on silicic acid and said second strip (1) comprising a silicone rubber.

2. The connecting element as claimed in claim 1, wherein the first strip comprises a support tape of a fabric or a plastic film, on which fabric or on which film the particles with a size between fine-grained and pulverulent are adhered by means of a plastic adhesive or paint.

3. The connecting element as claimed in claim 1 or in claim 2, wherein the particles with a size between fine-grained and pulverulent have a grain size in a range of 50µ.

4. The connecting element as claimed in claim 1, wherein the fine grained particles comprise hydrophobized, highly dispersed silicic acid.

5. The connecting element as claimed in claim 1, wherein hydrophobized, highly dispersed silicic acid has been added to the silicone rubber.

6. The connecting element as claimed in claim 1, wherein the silicone rubber comprises an addition cross linked silicone rubber.

7. The connecting element as claimed in claim 2, wherein the particles with a size between fine-grained and pulverulent has a grain size in the range of 50µ.

8. The connecting element as claimed in claim 5, wherein the silicone rubber comprises an addition cross linked silicone rubber.

* * * * *

UNITED STATES PATENT AND TRADEMARK OFFICE
CERTIFICATE OF CORRECTION

PATENT NO.   : 5,538,780
DATED        : July 23, 1996
INVENTOR(S)  : Rainer Pfefermann Claim 1, column 2, line 40, delete "eilicic" and insert -- silicic --.

Signed and Sealed this

Twenty-second Day of October, 1996

Attest:

BRUCE LEHMAN

Attesting Officer    Commissioner of Patents and Trademarks